United States Patent
Fritsch

(10) Patent No.: US 8,928,810 B2
(45) Date of Patent: Jan. 6, 2015

(54) SYSTEM FOR COMBINING VIDEO DATA STREAMS INTO A COMPOSITE VIDEO DATA STREAM

(76) Inventor: Bernhard Fritsch, Malibu, CA (US)

( * ) Notice: Subject to any disclaimer, the term of this patent is extended or adjusted under 35 U.S.C. 154(b) by 144 days.

(21) Appl. No.: 13/455,397

(22) Filed: Apr. 25, 2012

(65) Prior Publication Data

US 2012/0257112 A1 Oct. 11, 2012

Related U.S. Application Data

(63) Continuation of application No. 13/327,513, filed on Dec. 15, 2011.

(60) Provisional application No. 61/423,495, filed on Dec. 15, 2010.

(51) Int. Cl.
| | |
|---|---|
| *H04N 9/74* | (2006.01) |
| *H04N 7/14* | (2006.01) |
| *G06F 15/16* | (2006.01) |
| *H04N 7/173* | (2011.01) |
| *H04N 21/4788* | (2011.01) |
| *H04N 7/15* | (2006.01) |
| *H04N 21/2543* | (2011.01) |
| *H04N 21/431* | (2011.01) |
| *H04N 21/478* | (2011.01) |
| *H04N 21/6405* | (2011.01) |
| *H04N 21/81* | (2011.01) |

(52) U.S. Cl.
CPC ............. *H04N 21/4788* (2013.01); *H04N 7/15* (2013.01); *H04N 21/2543* (2013.01); *H04N 21/4314* (2013.01); *H04N 21/47815* (2013.01); *H04N 21/6405* (2013.01); *H04N 21/812* (2013.01)
USPC ..................... 348/580; 348/14.08; 348/14.02; 709/231; 725/118

(58) Field of Classification Search
CPC ............................. H04N 7/15; H04N 21/2543
See application file for complete search history.

(56) References Cited

U.S. PATENT DOCUMENTS

| | | | |
|---|---|---|---|
| 6,738,356 B1 * | 5/2004 | Russell et al. ................ 370/260 |
| 7,096,271 B1 * | 8/2006 | Omoigui et al. .............. 709/231 |
| 8,310,520 B2 * | 11/2012 | Gopal et al. ............... 348/14.08 |
| 2007/0285501 A1 * | 12/2007 | Yim ........................... 348/14.08 |
| 2009/0019060 A1 * | 1/2009 | Beckerman et al. ............ 707/10 |
| 2010/0085416 A1 * | 4/2010 | Hegde et al. ............... 348/14.08 |
| 2011/0145881 A1 * | 6/2011 | Hartman et al. ............... 725/118 |
| 2011/0249074 A1 * | 10/2011 | Cranfill et al. ............ 348/14.02 |
| 2012/0092443 A1 * | 4/2012 | Mauchly .................... 348/14.12 |

* cited by examiner

*Primary Examiner* — Jefferey Harold
*Assistant Examiner* — Sean Haiem
(74) *Attorney, Agent, or Firm* — Ted Sabety, Esq.; Sabety + Associates PLLC

(57) ABSTRACT

A system for controlling interaction with a social networking website is disclosed that provides control and editing features that place a branded participant in any on-line discussion in control of the content of the discussion. In addition, the system provides the ability of the branded participant to display various audio, visual or audio-visual clips on command or automatically so that advertising revenue may be attributed to the branded participant. When creating this branded channel, the system combines the incoming video feeds from participants into a single outgoing data feed in order to conserve bandwidth and to improve system performance.

15 Claims, 7 Drawing Sheets

SYSTEM FOR COMBINING VIDEO DATA STREAMS INTO A COMPOSITE VIDEO DATA STREAM

This application claims priority as a continuation to U.S. patent application Ser. No. 13/327,513, filed on Dec. 15, 2011, which is a non-provisional continuation of U.S. Provisional Patent Application No. 61/423,495, filed on Dec. 15, 2010, both of which are hereby incorporated by reference in their entireties.

SUMMARY OF THE INVENTION

Social networking Internet websites have become very popular. At the same time performing artists and other branded sources of content are seeking to maximize income that is collateral to the sales of tickets, recordings, movies or other easily pirated content. While artists and other brands rely on social networking websites for promotional reasons, the social networking websites rely on the participating brand to draw users who then see advertising. The problem is that the artist, or branded content does not earn any income from such sponsorships that are brokered by the social networking website. Therefore, there is a need for a system that provides a video channel for the performing artist or other branded content to control the content that appears on their chat room. When creating this branded channel, it is advantageous to combine the incoming video feeds from participants into a single outgoing video data feed in order to conserve bandwidth and to improve system performance.

DETAILED DESCRIPTION OF THE PREFERRED EMBODIMENTS

Figure 1:
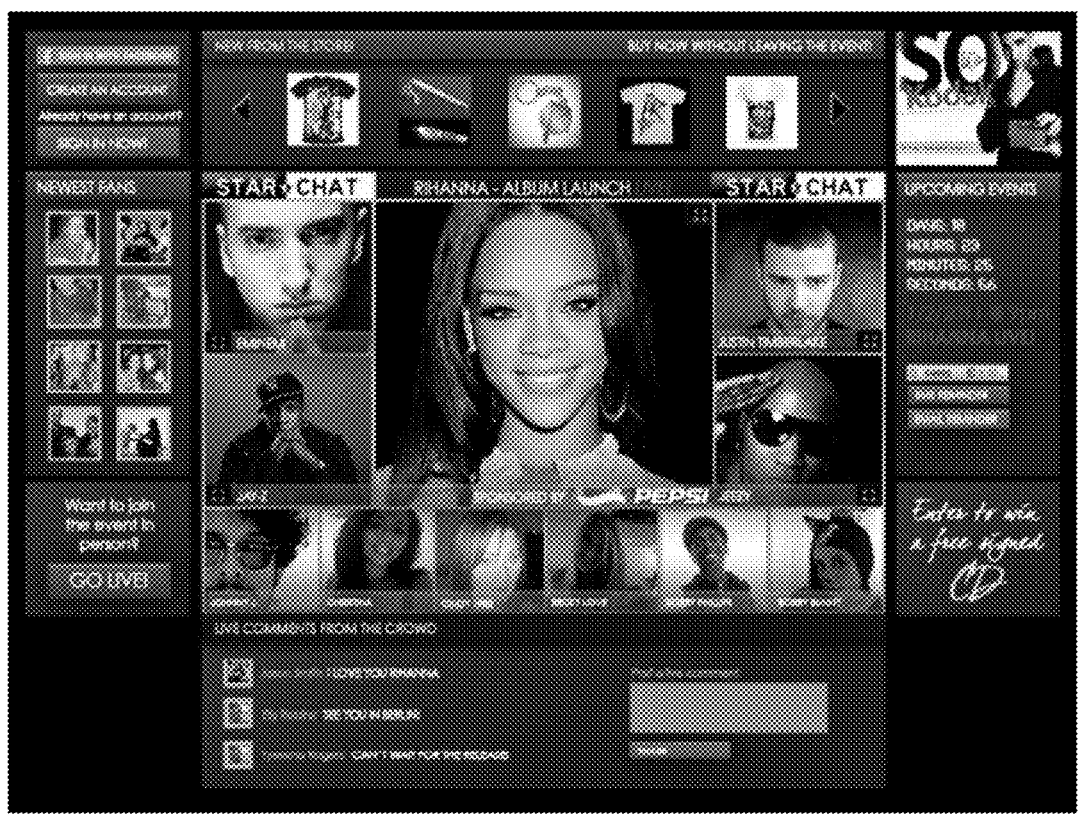
FIG. 1: Main page viewed by subscribers to an artist's chat room.
Figure 2:
FIG. 2: Linked content with controlled advertising.
Figure 3:
FIG. 3: Catalogue page showing alternative artists chat rooms available.
Figure 4:
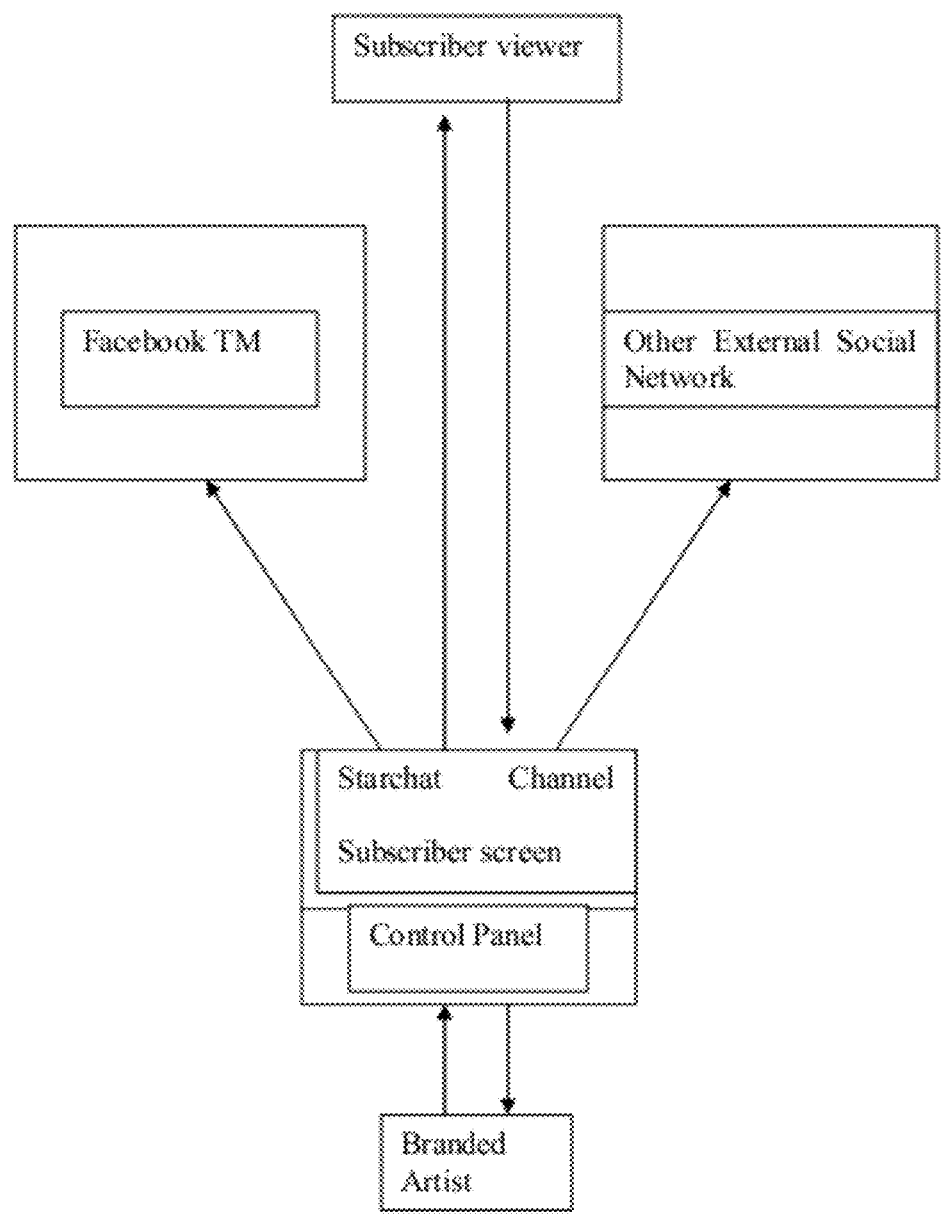
FIG. 4: Block diagram showing relationship of external social networking systems, Starchat Channel and the Artist's control panel.
Figure 5:
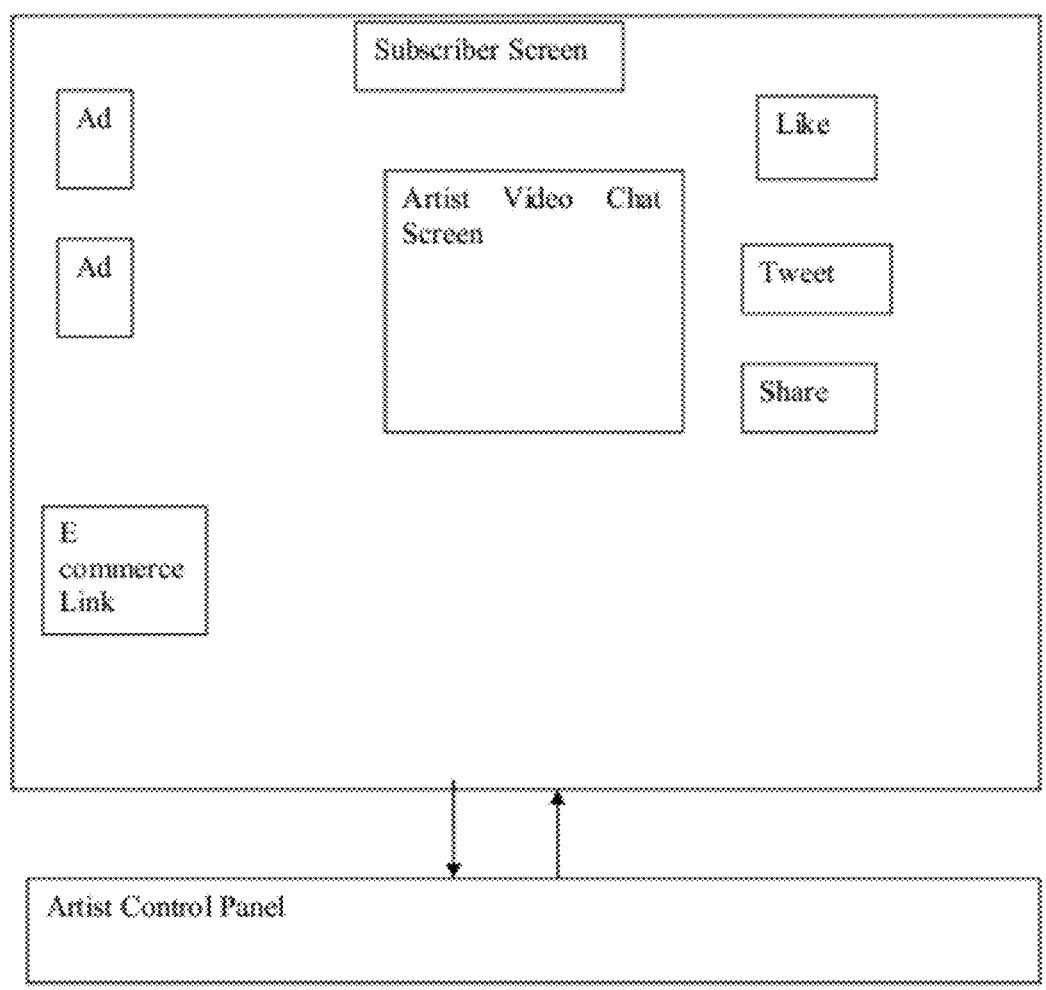
FIG. 5: Block diagram showing functionalities of subscriber's viewing screen, controlled by Artist control screen.
Figure 6:
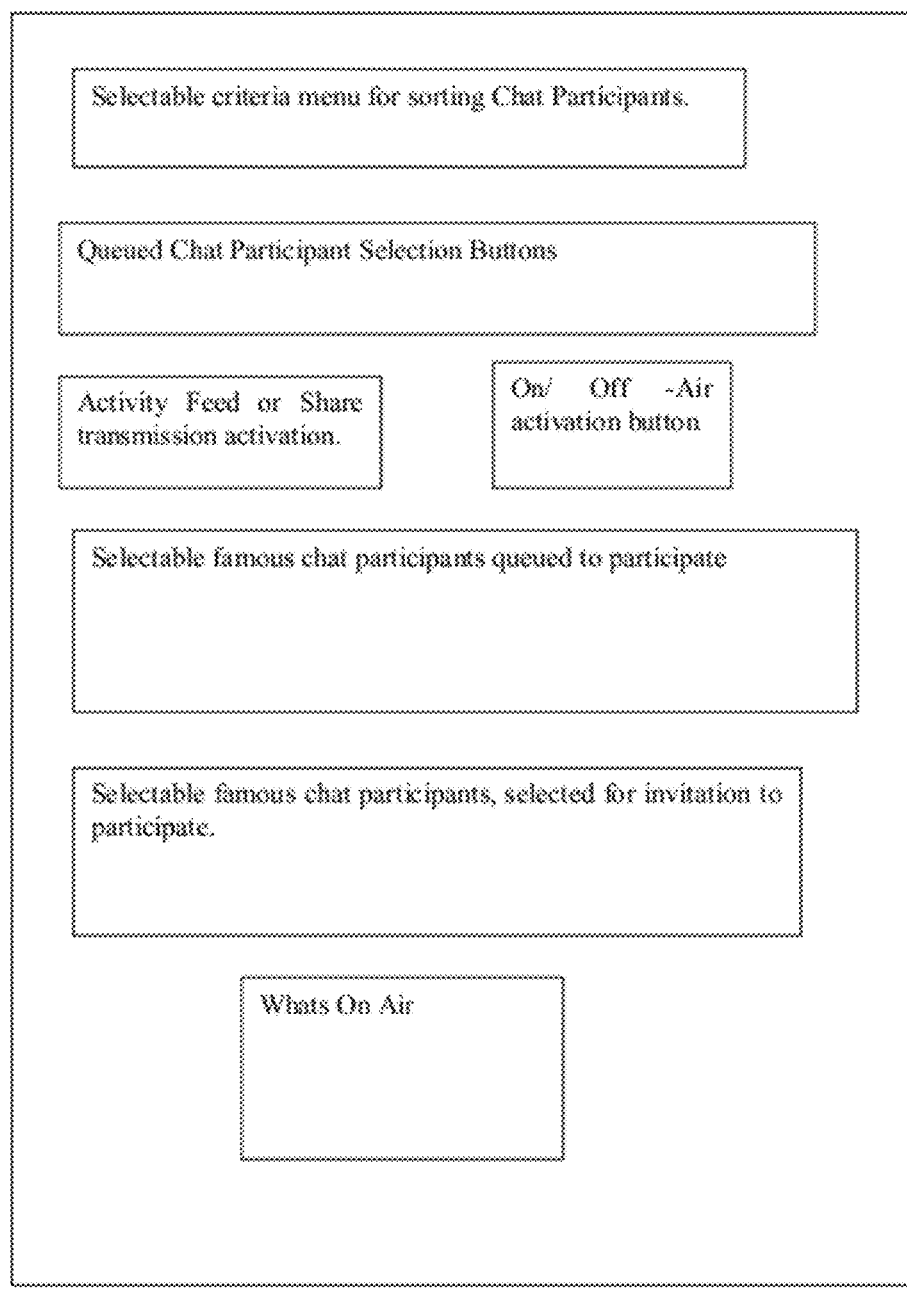
FIG. 6: Block diagram of an embodiment of the Artist control screen.
Figure 7:
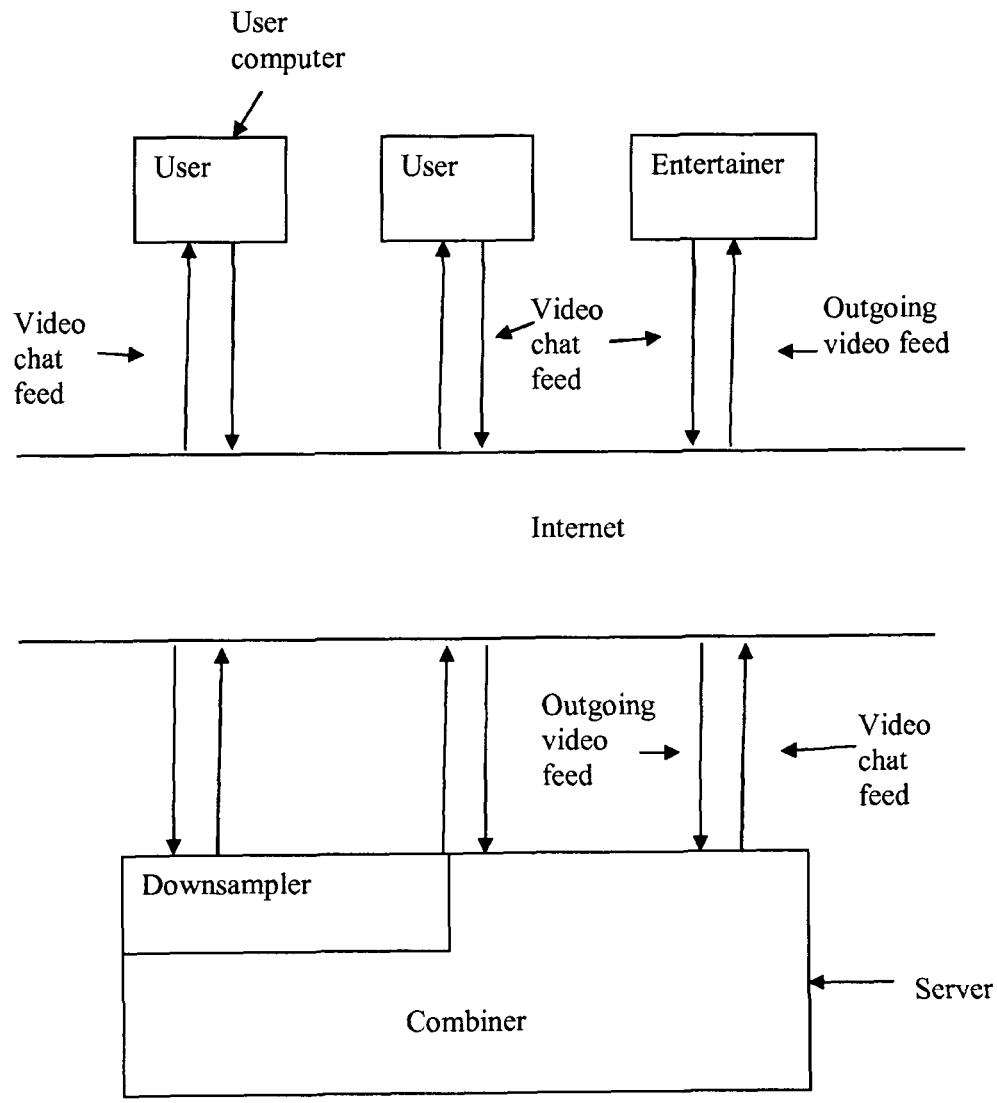
FIG. 7: Basic system architecture

The Star Interactive Network has an unlimited amount of brand-centric channels, whereby each of the channels has its own vertical brand controlled environment and content generating network of members. The Star Interactive™ network platform is tied together with a 2nd platform which integrates the channels together in the form of a central portal/hub. Every Star Interactive™ channel includes a branded hyperlink back to the hub itself in the same manner Youtube™ deploys on all embedded media. When users arrive at the hub they see all of the network's channels as well as countdowns providing pre-produced content or real time previews of streams/events currently "live" at any given time. The hub is also a place to serve featured community content such as contests, give aways, members and other exclusive to The Star Interactive Hub media. This arena also allows the network to cross promote the brands on the network in order to help gain popularity respectively through mutual or "circumstantial" viewers. As a bonus, users can come to the Star Interactive network and receive a universal key for example, a user profile/username and password that allows them to access all of the network brand's channels with one login.

Interactive Video Component:

The chat platform component is a viral, multi channel, interactive video streaming platform. This portal serves as the hub for all entertainers in the network with the ability to connect the rooms or individual video streams together. The entertainers, or stars, operate the portion of the platform that is branded for the entertainer to provide a video or text chat experience for their fans who are users of that branded channel.

Users can attend a live streaming event where they can shop, have the opportunity to chat with the entertainer through video or text, share events to all of their friends at other social networks and more all without ever leaving the event. The video interface allows any type of video content to be displayed to the users, including music videos or any other pre-produced content so that in the breaks between live streaming events additional entertainment can be provided. The technology also supports custom contests and competitions with free digital content as rewards for users making a commitment to the brand by way of signing up or providing personal details.

One of the most important features of the Star Interactive chat platform is the ability to control the events in real time. Administrators or the entertainers can select which users get the opportunity to go live with them, which users to ban or just dismiss once, and which users they wish to talk to using an audio and/or video on/off control. Entertainers can include special guests presented at certain video positions on the screen and the other network channels as well. The entertainer's audio stream always overrides the audio of the other chat participants so that the entertainer has full control of their chat environment at all times. All interactive events are recorded and added as available content for later viewing on the network. All users who have been live will be notified of the availability of the recorded event so they can have a record of their interaction.

The Engine integrates advertising throughout the multiple layers of the platform. All pages include banner ads and all videos and music content contain pre-roll, post-roll and mid-roll overlay ads with prime placement and high traffic. Sponsors can create custom campaigns specifically tailored to the entertainers' platform and demographic. The sponsored competition engine is an important element offered to brands so they can sponsor contests and competitions. The network enables the brand to connect on a more sophisticated partnership level. Brands and Advertisers work together to achieve massive exposure so that the advertiser's own brand achieves its ultimate goal to connect exclusively to entertainer's fans.

Consumer-Generated Content:

Consumer generated content (CGC) on the concentrated vertical network keeps fans/users coming back to share content with fans of same brand or entertainer. The interactive network users generate much of the content for the network and have a 24/7 community to keep the users entertained when live events are offline. Users can do anything from status updates from third party social networks to viral videos from Youtube™. This content is also monetized through advertisement displays so that revenue is earned on all content residing on the network platform, and not simply the advertising appearing on the entertainer's own channel.

Technologies: Users can upload photos and embed videos from Youtube™ and other video sharing sites that are associated with their user account. The interactive network allows all existing tags and information about the video to be automatically carried over to the video channel on the user's selected entertainer's channel. All user info and generated content is stored in a MYSQL database and updated in the front end by PHP and AJAX/JAVASCRIPT.

The interactive network is built using PHP/MySql primarily in order to handle the dynamic data and content. Some components use AJAX/JQuery for live updating without refreshing the page. Additional code developed integrates the Facebook™ application/API that pulls user data from Facebook's database into the Star Interactive database at the command of the user.

A video/audio player uses Flash for playback and XML to create playlists. Advertising displays are integrated into the screen appearance using Javascript as well as built in Flash. The interactive network can either integrate affiliate advertising or simply use google/Longtail™ provided advertising content files or data streams.

The streaming video and audio is handled by a Flash coded program module. A single audio compression rate is used for all users and in the preferred embodiment video is compressed live using the high quality h.264 encoder. The main window's video quality is less compressed and therefore higher while, the special guest windows are more compressed and the user chat windows have the lowest quality as a result of the most compression. The code allows an authorized operator (which can be an administrator, entertainer or network host) to turn on and off users at any time during the chat session to control who they are speaking to. The entertainer can also select which users can participate in the chat. This control is handled by flash and a live PHP/MYSQL control.

In one embodiment, a central server presents each user with the visual part of the interactive environment through a web-browser operating on the user's computer device. In this embodiment, the video data feeds are received at the central server from all of the user's devices. In addition, a video data feed is received from the entertainer's device. The central server then combines all of the video data feeds into a single outgoing video data feed that is presented on the web-page back out to the users for display on the browser window operating on the user's device.

In the preferred embodiment, the incoming video data feeds from the users are down-encoded to a higher compression in order to conserve bandwidth. The entertainer's incoming video data feed is encoded to a lower level of compression so that its appearance is higher quality than the users and guests. The incoming video data feeds are then merged. This requires synchronizing the video frame data so that at a given instant, the pending video frame for each of the sources of video is labeled with the same time stamp. As the video frame is stored in computer memory, a data structure is created that contains the time stamp and a pointer to that video frame instance. At the same time as the video frames are being stored, another process formulates the outgoing video stream. That process has a frame clock that is increasing the frame count and for each frame count, outputs the current frame into the outgoing data stream. When a frame is being prepared for output, the process examines screen layout configuration files and determines how to resize the constituent incoming video frames that are labeled with the same or a corresponding time stamp. The process then stores that resized data in the portion of the outgoing video frame data storage corresponding to the location indicated by the configuration data. The video frame may optionally include video advertising feeds, while in other embodiments, these may be directly transmitted to the users' computers from advertising servers. In either case, the constructed output video frame can then be transmitted on the data stream to the users. When all of the incoming video frame data is resized and positioned in outgoing video frame buffer, the outgoing video frame is ready for encoding and transmission. This approach conserves bandwidth because the same amount of bandwidth is used to service all of the users and the users have a constant input video bandwidth rather than a fluctuating one depending on the number of displayed guests.

In another embodiment, the system determines for each of the received video data signals a region that such signal will appear when the outgoing signal is rendered and then selects from each of the received video signals a frame of video data. From those frames, the process selects from each selected frames a set of pixels values comprising the selected frames. The process stores in computer memory an outgoing frame of video data by mapping the selected pixels to the region corresponding to the video data signal the frame and selected pixels originate from. The mapping step is comprised of scaling the selected pixel location coordinates and storing the selected pixel values at the scaled locations in order that when the outgoing frame is rendered, a scaled version of the selected frame appears in the region of the outgoing video data stream corresponding to the video data signal that the frame originates from.

In this embodiment of the system, there are two subsystems. In the first subsystem, a central server contains a data structure associated with the entertainer. That data structure will also contain references to a plurality of users of the first subsystem. These users access the subsystem by using their individual computer devices operating an Internet browser or other client code to view data feeds transmitted by the first subsystem. That data feed can include data related to data that the entertainer has input into the first subsystem and that is stored in the data structure associated with the entertainer. The first subsystem can detect certain kinds of data input from the entertainer. In one case, it can be an announcement from the entertainer. In another case, it can be a hyperlink to another location on the Internet. As a result, a data message is generated by the first subsystem that is transmitted to the list of users associated with the entertainer. In another embodiment, the essential contents of the data message (or a reference to that information) is stored in the data structures associated with the users who are associated with the entertainer. This mechanism makes it possible for the entertainer to announce to their associated users on the first subsystem that there is some event occurring on the entertainer's branded channel operating on the second subsystem and transmitting to those users a reference to the location on the Internet of that event.

The second subsystem then operates the branded channel. Users of the first subsystem, who actuate the received reference, which in the preferred embodiment is a URL, cause their browser to display the appropriate location in the second subsystem. The second subsystem then transmits the audio and video feed to that user's computer.

If an entertainer is doing something and displays it on their branded channel, the activity feed from that channel is transmitted to the associated social networking websites. For example, if the artist Rihanna™ commences a video chat, users can press a share button so that the announcement that she is on chat is distributed across the associated external social network of that user. In one embodiment, these are referred to as "activity feeds".

An important capability of the entertainer's branded channel is the Control Panel. Unlike most social networking websites or chat rooms, the notion of a branded artist or other content having a purely free-for-all chat room is unrealistic, due to the large demand from fans, while there being a single artist. The Star Interactive system permits the artist to control the chat room activity in a manner that places them in a superior position to the other participants. This is essential to maximize the quality of the chat experience and to tailor it for the requirements of the brand.

In one embodiment, the entertainer has a special page that is only accessible to the artist or their authorized representative through a login name and password. The entertainer can view possible chat participants who are placed in a queue, including famous associates of the artist or those subscribers whose karma points have placed them high on the list. The artist can then activate these channel sources as active to the video chat. In another embodiment, all the other subscribers can continue to text chat, where the text is displayed around the video chat content.

In this embodiment, the system contains a data structure associated with the entertainer that represents the appearance of the entertainer's branded channel. That data structure is updated with references to the users or guests (each of whom have their own associated data structure).

In another embodiment, the entertainer can terminate the participant using the GUI.

In this embodiment, the system detects a command input received from the entertainer's computing device that contains data that indicates a selection of one of the audio and video feeds associated with a chat room participant and a command requesting a termination. Upon receipt of this command or combination of commands, the video frame production for the branded channel stops using the audio and video feed from that participant. In yet another embodiment, the system will query the data structures associated with the users who are associated with the branded channel and select an audio/video feed from a user whose indicated position in the queue places them at the front of the queue.

In another embodiment, the entertainer can use the GUI to select the participant to receive some kind of reward, selected from a pre-determined menu.

In another embodiment, the entertainer, who has their own external social network page, would have a link on their branded channel control panel that would cause an activity feed to be sent out over that external social network to the entertainer's associated participants who are members of that external social network.

In another embodiment, the entertainer's control panel can also queue up requests from other artists or brands operating on the Star Interactive system to send out share functions to their respective network of external social network associates. The control panel permits the entertainer to view the request and either to accept or reject it. In one embodiment, an accounting system tracks the request and the outcome and stores an accounting charge associated with providing the permission to the requesting entertainer. In another embodiment, the Star Interactive channel tracks the revenue being earned by the requesting entertainer's channel and then calculates a pre-determined amount of that revenue to be charged to the requesting entertainer.

In another embodiment, when the user calls for or selects a link to a music or video source, the Star Interactive system will download and launch a player on the viewer's computer. This player will also receive a predetermined URL to be displayed at the bottom of the player.

In another embodiment of the entertainer's channel control panel, an additional subsidiary control panel can be created that is used to screen the submissions of the selected subscriber chat participants. This screen permits a second person to see and hear the submission of the selected participant prior to it going on the air. Selections that are accepted are then forwarded to the artists' control screen queue. The subsidiary control screen can also be used by the entertainer's staff to organize and check any advertising feeds or other promotions that have been submitted to ensure that the advertising does not conflict with the entertainer's sponsorship agreements.

Operating Environment:

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a firewall proxy to one server, which routes communications to another server that executes the disclosed methods. The precise details of the data network architecture does not limit the claimed invention. Further, the user's computer may be a laptop or desktop type of personal computer. It can also be a video game console, a cell phone, smart phone or other handheld device. The precise form factor of the user's computer does not limit the claimed invention. In one embodiment, the user's computer is omitted, and instead a separate computing functionality provided that works with the central server. In this case, a user would log into the server from another computer and access the simulated space. In another embodiment, the user can operate a local computer running a browser, which receives from a central server a video stream representing the rendering of the simulated space from the point of view associated with the user.

In this embodiment, the user computer captures the input of the user, e.g. audio input, video input and movement of the trackpad or other input device, and transmits this data to the server. The server then calculates a bitmap for each upcoming video frame using this revised data. The calculation includes a perspective rendering for each user, calculated at such user's virtual location. The Server then translates individual streams out to the individual users, each stream then having the perspective associated with the destination user.

This may be housed in the central server or operatively connected to it. In this case, an operator can take a telephone call from a customer and input into the computing system the customer's data in accordance with the disclosed method. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database uses cloud storage services such as Amazon SimpleDB, housed in one or more operatively connected servers operatively connected to computer memory, for example, disk drives. The invention may be executed on another computer that is presenting a user a semantic web representation of available data. That second computer can execute the invention by communicating with the set of servers that house the relational database. In yet another embodiment, the initialization of the relational database may be prepared on the set of servers and the interaction with the user's computer occur at a different place in the overall process.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a server system of generating a composite video data signal from a plurality of video signals received from a corresponding plurality of remote computers operatively connected to the server system by means of a data network comprising:

receiving the plurality of video data signals from the corresponding plurality of remote computers, where one of the plurality of remote computers is identified by the server system as having a higher level of control authority over the server system than the remaining remote computers that have a lower control authority;

receiving from the remote computer with the higher level of control authority at least one command that encodes a selection of a corresponding plurality of the received plurality of video signals;

combining the selected plurality of received video data signals into an outgoing video data signal transmitted from the server system where each of the selected received video signals is presented in a predetermined portion of the screen when the outgoing video signal is rendered and the video signal from the remote computer with the higher level of control authority is allocated a predetermined portion of the screen that is more prominent than the video signals associated with the lower authority remote computers; and transmitting the outgoing video data signal to the remote computers of the lower control authority.

2. The method of claim 1 where the combining step is comprised of:

determining for each of the selected received video data signals a region that such signal will appear when the outgoing signal is rendered;

selecting from each of the selected received video signals a frame of video data;

selecting from each of the selected frames a set of pixels values comprising the selected frames; and storing in computer memory an outgoing frame of video data by mapping the selected pixels to the region corresponding to the video data signal that the frame and selected pixels originate from, said mapping step comprised of scaling the selected pixel location coordinates in order that when the outgoing frame is rendered, a scaled version of the selected frame appears in the region corresponding to the video data signal that the frame originates from.

3. The method of claim 1 further comprising: encoding the outgoing video signal such that the video signal from the remote computer with the higher level of control authority is allocated a higher bandwidth than the selected video signals associated with the lower authority remote computers.

4. The method of claim 1 further comprising:

receiving from the remote computer with the higher control authority a command encoding a selection of one of the selected plurality of incoming video data signals; and in dependence on the received command, excluding the selected one of the selected plurality from the outgoing video signal.

5. The method of claim 1 further comprising:
synchronizing the video frame data of the selected received video data signals so that at a given instant, the pending video frame for each of the selected received video data signals is associated with the same time stamp;
creating and storing in computer memory a data structure that contains for each video frame the time stamp and a pointer to that video frame data instance;
obtaining from computer memory data representing screen layout configuration indicating the location placement for at least one of the selected received video data signals in the outgoing video signal;
determining from the data representing screen layout configuration resizing parameters to apply to each of the constituent selected incoming video frame instances that are labeled with a corresponding time stamp;
storing the resized video data in the corresponding portions of the outgoing video frame data storage in accordance with the location indicated by the configuration data; and
upon all of the incoming video frame data being resized and stored in the outgoing video frame buffer, encoding the video frame.

6. The method of claim 1 further comprising:
receiving from the remote computer with a higher level of authority digital data encoding commands that represent a screen layout configuration indicating placement for at least one of the selected received video signals.

7. The method of claim 6 where the receiving step occurs while the process of creating the composite video signal is operating.

8. A computer system comprising at least one computer and at least one storage device operatively connected to said at least one computer adapted to perform any of the methods recited by claims 1 through 3 or 4 through 7.

9. A non-transitory computer readable data storage medium containing program code that when executed by a computer causes the computer to execute any of the methods recited by claims 1 through 3 or 4 through 7.

10. The method of claim 1 where the combining step is further comprised of: retrieving from a data storage device operatively connected to the server system a pre-existing video signal and replacing the video signal received from the remote computer with the higher level of control authority with the retrieved video signal.

11. The method of claim 10 where the combining step is further comprised of:
receiving from the remote computer with the higher level of control authority a command that causes the replacing step to occur in dependence on the command, while the combining step is operating in real time.

12. The method of claim 10 further comprising:
transmitting to the remote computer at least one video signal retrieved from a storage device operatively connected to the server system;
receiving from the remote computer with the higher level of authority a command encoding a selection of one of the at least one transmitted video signals; and
using the received selection command to cause the server system to use the stored selected video signal as the retrieved video signal in the replacement step.

13. The method of claim 12 further comprising:
receiving from at least one of the remote computers with a lower level of control authority a video signal; and
storing the video signal in the storage device.

14. A computer system comprising at least one computer and at least one storage device operatively connected to said at least one computer adapted to perform any of the methods recited by claims 10 through 13.

15. A non-transitory computer readable data storage medium containing program code that when executed by a computer causes the computer to execute any of the methods recited by claims 10 through 13.

* * * * *